United States Patent
Song et al.

(10) Patent No.: US 8,774,086 B2
(45) Date of Patent: Jul. 8, 2014

(54) BEAMFORMING METHOD USING MULTIPLE ANTENNAS

(75) Inventors: Young Seog Song, Daejeon (KR); Dong Seung Kwon, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 350 days.

(21) Appl. No.: 12/735,186

(22) PCT Filed: Jul. 16, 2008

(86) PCT No.: PCT/KR2008/004168
§ 371 (c)(1),
(2), (4) Date: Jun. 18, 2010

(87) PCT Pub. No.: WO2009/078529
PCT Pub. Date: Jun. 25, 2009

(65) Prior Publication Data
US 2010/0265853 A1    Oct. 21, 2010

(30) Foreign Application Priority Data
Dec. 18, 2007  (KR) .................. 10-2007-0133660
Feb. 25, 2008  (KR) .................. 10-2008-0016823

(51) Int. Cl.
*H04W 4/00*     (2009.01)

(52) U.S. Cl.
USPC ................. 370/328; 370/334; 370/465

(58) Field of Classification Search
USPC ........................ 370/280, 311, 465, 328, 334
See application file for complete search history.

(56) References Cited

U.S. PATENT DOCUMENTS

| | | | | |
|---|---|---|---|---|
| 6,778,507 B1 * | 8/2004 | Jalali | ................. | 370/317 |
| 6,839,573 B1 * | 1/2005 | Youssefmir et al. | ........ | 455/562.1 |
| 7,379,759 B2 * | 5/2008 | Nakaya et al. | .............. | 455/562.1 |
| 7,583,982 B2 * | 9/2009 | Olesen et al. | ............... | 455/562.1 |
| 7,853,216 B1 * | 12/2010 | Breslin et al. | ............... | 455/67.11 |
| 2005/0213682 A1 | 9/2005 | Han et al. | | |
| 2006/0234645 A1 * | 10/2006 | Lin et al. | .......................... | 455/69 |
| 2008/0123602 A1 * | 5/2008 | Beek et al. | .................... | 370/336 |
| 2009/0067513 A1 | 3/2009 | Kim et al. | | |
| 2009/0207765 A1 | 8/2009 | Yamaura | | |

FOREIGN PATENT DOCUMENTS

| | | |
|---|---|---|
| EP | 1816759 A2 | 8/2007 |
| JP | 2007-318728 | 12/2007 |
| KR | 10-2001-0030605 | 4/2001 |

(Continued)

OTHER PUBLICATIONS

International Search Report and Written Opinion of International Searching Authority dated Jan. 19, 2009 in relation to International Application No. PCT/KR2008/004168.

*Primary Examiner* — Huy D Vu
*Assistant Examiner* — Kuo T Chiang

(57) ABSTRACT

A mobile station includes a plurality of mobile station antennas that receive at least one independent training signal from a plurality of base station antennas, and estimates a downlink channel formed by each of a plurality of base station antennas and each of the mobile station antennas by using the at least one independent training signal. The mobile station generates a beam vector by using the downlink channel, and forms transmission beams in the plurality of mobile station antennas for transmitting a signal to an uplink.

18 Claims, 4 Drawing Sheets

(56) References Cited

FOREIGN PATENT DOCUMENTS

| KR | 10-2005-0089698 | 9/2005 |
| KR | 10-2005-0106657 | 11/2005 |
| KR | WO2005109678 A1 * | 11/2005 | ............... H04B 7/04 |
| KR | 10-2007-0056161 | 5/2007 |
| WO | WO 99/14870 | 3/1999 |
| WO | WO 2006/129958 A1 | 12/2006 |

* cited by examiner

BEAMFORMING METHOD USING MULTIPLE ANTENNAS

CROSS-REFERENCE TO RELATED APPLICATION(S)

The present application is related to International Application No. PCT/KR2008/004168 filed Jul. 16, 2008 entitled "BEAMFORMING METHOD USING MULTIPLE ANTENNAS" which claims priority to Korean Patent Application No. 10-2007-0133660 filed Dec. 18, 2007 and Korean Patent Application No. 10-2008-0016823 filed Feb. 25, 2008. International Application No. PCT/KR2008/004168 is assigned to the assignee of the present application and is hereby incorporated by reference into the present disclosure as if fully set forth herein. The present application hereby claims priority under 35 U.S.C. §119(a) to International Patent Application No. PCT/KR2008/004168 and Korean Patent Application Nos. 10-2007-0133660 and 10-2008-0016823.

TECHNICAL FIELD

The present invention relates a beamforming method using multiple antennas. Particularly, it relates to a beamforming method for transmitting a signal to uplink in a time division duplex (TDD) system.

BACKGROUND ART

In wireless transmission, methods for improving sector throughput by using multiple antennas have been researched.

The methods that use multiple antennas include a smart antenna method, a diversity method, and a spatial multiplexing (SM) method, as examples. The smart antenna method acquires a plurality of gain forming antenna beams for transmitting/receiving a signal with a high signal to noise ratio (SNR). The diversity method that uses multiple antennas decreases receiving probability of a signal having a low SNR by multiplexing signal paths when channel correlation is low so as to obtain a gain. In addition, the SM method obtains a multiplexing gain by transmitting a different signal to each of a plurality of antennas when the SNR is high.

For transmission of a radio signal, the base station uses various methods such as a direction of arrival (DOA) beamforming method using multiple antennas and a minimum mean square error (MMSE) method for avoiding another user's interference. However, when the terminal transmits a radio signal, the terminal typically uses one transmitting antenna due to increasing size and power consumption of the terminal.

Considering the contemporary standardization trends, an SM transmission method that uses multiple transmission antennas and a space time coded transmit diversity (STTD) method have been proposed for radio signal transmission to an uplink. In addition, a method for increasing an SNR by forming transmission beams in multiple antennas has been researched. A space division multiple access (SDMA) method in which a plurality of terminals transmit an uplink signal to one base station by sharing resources is an example of this method. The SDMA method may be applied to a plurality of terminals that respective include one transmission antenna or a terminal including two or more transmission antennas.

As described, transmission beamforming by using multiple antennas is needed for increasing sector capacity in the SM method, the SDMA method, and a single input single output (SISO) method. However, there is a problem of increasing power consumption of a terminal when the uplink signal is transmitted by using the multiple antennas.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a beamforming method having an advantage of preventing power consumption of a mobile station from being increased when the mobile station transmits a signal to an uplink by using multiple antennas.

Technical Solution

An exemplary beamforming method according to an embodiment of the present invention includes: receiving at least one training signal from a plurality of base station antennas by using a plurality of mobile station antennas; estimating downlink channels formed by the plurality of base station antennas and the plurality of mobile station antennas by using the at least one training signal; generating a beam vector by using the downlink channels formed by the respective base station antennas and the respective mobile station antennas; and beamforming by applying the beam vector to the plurality of mobile stations.

The generating of the beam vector includes selecting one base station antenna that forms a downlink channel with the maximum gain from among the plurality of base station antennas, and generating the beam vector by using a plurality of phases that respectively correspond to downlink channels formed by the one base station antenna and the plurality of mobile station antennas.

The beam vector has a plurality of beam coefficients that respectively correspond to the plurality of mobile stations, and each of the plurality of beam coefficients has the same gain. Each phase of the plurality of beam coefficients corresponds to an inverse number of each of the plurality of phases. The beamforming includes: generating a plurality of beam signals by respectively applying the plurality of beam coefficients to a baseband signal; generating a plurality of beam signals in a wireless band by frequency-converting the plurality of beam signal into wireless band signals; and beamforming by respectively applying the beam signals in the wireless band to the plurality of mobile stations.

The phases of the plurality of beam coefficients respectively correspond to a difference between the phase of a downlink channel formed by one of the plurality of mobile station antennas and the one base station antenna and each of the plurality of phases. In addition, the beamforming includes generating a plurality of beam signals by respectively applying the plurality of beam coefficients to the wireless band signals, and beamforming by respectively applying the plurality of beam signals to the respective mobile station antennas.

In addition, the generating of the beam vector includes: generating a plurality of candidate beam vectors that respectively include a plurality of beam coefficients that respectively correspond to the plurality of mobile station antennas; calculating a plurality of gains that respectively correspond to the plurality of candidate beam vectors by using the plurality of candidate beam vectors and downlink channels formed by the respective base station antennas and the respective mobile station antennas; detecting a gain having the maximum gain from among the plurality of gains; and generating the beam vector by selecting one beam vector that corresponds to the maximum gain from among the plurality of candidate beam vectors. Here, the number of the plurality of candidate beam vectors corresponds to the number of the plurality of mobile station antennas.

The phase of each of the plurality of beam coefficients is proportional to an index of each candidate beam vector and an index of a mobile station that corresponds to the beam coefficient, and a gain of each of the plurality of beam coefficients corresponds to an inverse number of a square root of the number of the plurality of mobile station antennas.

The generating of the beam vector includes generating the beam vector with a random-generated beam vector or a beam vector that has been applied to the plurality of mobile station antennas for previous beamforming when moving speed of the mobile station is greater than a reference speed.

An exemplary beamforming method according to another embodiment of the present invention includes: receiving a training signal from one base station by using a plurality of mobile station antennas; estimating downlink channels formed by the one base station antenna and the plurality of mobile station antennas by using the training signal; generating a beam vector by using the downlink channel; and beamforming by applying the beam vector to the plurality of mobile station antennas.

The generating of the beam vector includes generating the beam vector by using a plurality of phases that respectively correspond to the downlink channels, and the beam vector includes a plurality of beam coefficients that respectively correspond to the respective mobile station antennas. The plurality of beam coefficients respectively have the same gain.

The phase of each of the plurality of beam coefficients corresponds to an inverse number of each of the plurality of phases.

The beamforming includes: generating a plurality of beam signals by respectively applying the plurality of beam coefficients to a baseband signal; generating a plurality of beam signals in a wireless band by frequency-converting the plurality of beam signals to wireless band signals; and beamforming by respectively applying the plurality of beam signals in the wireless band to the plurality of mobile station antennas.

Each phase of the plurality of beam coefficients corresponds to a difference between the phase of a downlink channel formed by one of the plurality of mobile station antennas and the one base station antenna and each of the plurality of phases.

The beamforming includes generating a plurality of beam signals by respectively applying the plurality of beam coefficients to a wireless band signal, and beamforming by respectively applying the plurality of beam signals to the respective mobile station antennas.

The generating of the beam vector includes generating the beam vector with a random-generated beam vector or a beam vector that has been applied to the plurality of mobile station antennas for previous beamforming when moving speed of the mobile station is greater than a reference speed.

Advantageous Effects

According to the present invention, a signal is transmitted to an uplink by using multiple antennas so that bit error ratio (BER) performance and sector throughput can be improved. In addition, since a beam for transmitting the signal to the uplink can be efficiently formed, increase of power consumption of the mobile station due to the use of the multiple antennas can be prevented.

MODE FOR THE INVENTION

Figure 1:
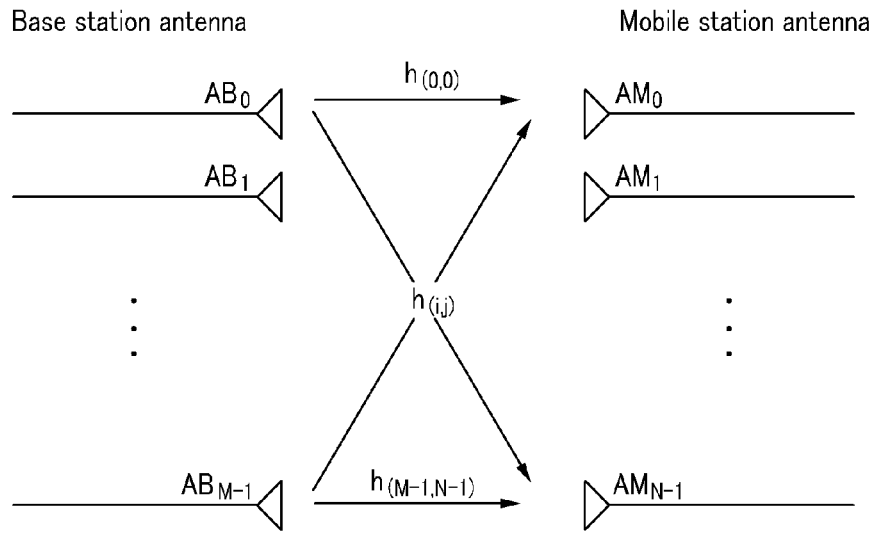
FIG. 1 shows a downlink channel between each of a plurality of base station antennas and each of a plurality of mobile station antennas in a time division duplex (TDD) system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprise", and variations such as "comprises" or "comprising", will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

In the specification, a terminal can be a portable subscriber station (PSS), a mobile terminal (MT), a subscriber station (SS), a mobile station (MS), user equipment (UE), and an access terminal (AT), and can include all or partial functions of the mobile terminal, the subscriber station, the portable subscriber station, and the user equipment.

In the specification, a base station (BS) can represent an access point (AP), a radio access station (RAS), a nodeB (Node B), a base transceiver station (BTS), and a mobile multihop relay (MMR)-BS, and can include all or partial functions of the access point, the radio access station, the nodeB, the base transceiver station, and the MMR-BS.

A beamforming method according to an exemplary embodiment of the present invention will now be described in detail with reference to the accompanying drawings.

The exemplary embodiment of the present invention is related to a beamforming method for a mobile station to transmit data to a base station through an uplink by using multiple antennas in a time division duplex (TDD) system.

The TDD system provides bi-directional communications between the mobile station and the base station by using a single frequency band, and radio resources between the mobile station and the base station are allocated to an uplink and a downlink in a mobile station in the time axis. The uplink is used by the mobile station for transmitting a signal to the base station, and the downlink is used by the base station for transmitting a signal to the mobile station.

The base station includes a plurality of transmitting-receiving antennas (hereinafter referred to as "base station antenna"), and performs multiple input multiple output (MIMO) by using the plurality of base station antennas. The mobile station includes a plurality of transmitting-receiving antenna (hereinafter referred to as "mobile station antenna"), and performs the MIMO by using a plurality of mobile station antennas.

FIG. 1 shows downlink channels between a plurality of base station antennas and a plurality of mobile station antennas in the TDD system according to the exemplary embodiment of the present invention.

As shown in FIG. 1, each of M base station antennas $AB_0$, $AB_2$, ..., $AB_{M-1}$ and each of N mobile station antennas $AM_0$, $AM_2$, $AM_{N-1}$ generate N×M downlink MIMO channels.

The BS transmits at least one preamble signal to the mobile station by using at least one base station antenna among the M base station antennas or respectively transmits the M base station antennas by respectively using the M base station antennas. In this instance, the preamble signal is transmitted for notifying the BS of frame synchronization.

The BS transmits a pilot signal along with a data signal to the mobile station by using at least one of the M base station antennas. In this instance, the pilot signal is used for downlink channel estimation in order to compensate the amplitude and phase estimates of the data signal distorted due to multipath attenuation.

While transmitting the data signal and the pilot signal, the base station further transmits a midamble signal to the mobile station by using at least one of the M base station antennas. In this instance, the midamble signal identifies each of the M base station antennas.

As described, the preamble signal, the pilot signal, and the midamble signal have a structure or a format that has been predetermined between the base station and the mobile station, and will be referred to as a training signal.

The mobile station receives at least one independent training signal by using the respective N mobile station antennas, and performs downlink MIMO channel estimation by using the at least one independent training signal.

In the TDD system, an uplink channel and a downlink channel use the same frequency bandwidth and are reversible, and they are close to each other in the time axis so that the uplink channel can be estimated from the downlink channel when the moving speed of the mobile station is low.

However, a downlink channel and an uplink channel estimated by the mobile station by using at least one independent training signal may not be completely equal to each other due to a gain of the base station antenna, amplification of a base station circuit, a gain of the mobile station antenna, and amplification of a mobile station circuit.

That is, the uplink channel state $h_{j,i}$ estimated by the i-th base station antenna among the M base station antennas and the j-th mobile station antenna among the N mobile station antennas can be obtained by using a downlink channel $h_{i,j}$ estimated by the i-th base station antenna and the j-th mobile station antenna, as shown in Math Figure 1.

$$h_{j,i} = \alpha * h_{i,j}$$ [Math Figure 1]

As shown in Math Figure 1, the uplink channel condition $h_{j,i}$ and the downlink channel condition $h_{i,j}$ are proportional to each other with a ratio of a constant $\alpha$. Herein, the constant $\alpha$ implies a ratio between a downlink channel condition and an uplink channel condition in accordance with a gain of the base station antenna, amplification of a base station circuit, a gain of the mobile station antenna, and amplification of a mobile station circuit.

According to the exemplary embodiment of the present invention, there is no need of estimating an absolute propagation channel value of each of a plurality of base station antennas and a plurality of mobile station antennas. Therefore, the mobile station estimates an uplink channel by using a downlink channel that has been estimated by using at least one independent training signal according to the exemplary embodiment of the present invention. In this instance, the mobile station estimates a downlink channel condition per at least one downlink channel slot, and estimates an uplink channel downlink channel in the same manner as the downlink channel whenever estimating the downlink channel condition. In this way, uplink channel estimation performance can be improved by using reversibility between a downlink channel and an uplink channel in a TDD system.

Figure 2:
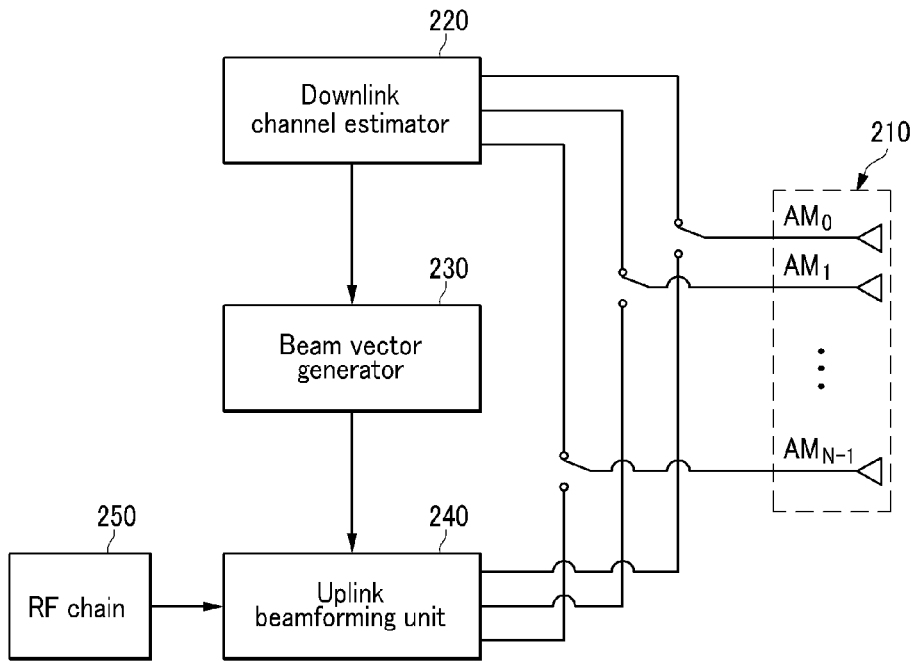
FIG. 2 is a block diagram of a mobile station according to a first exemplary embodiment of the present invention.

FIG. 2 is a block diagram of a mobile station according to a first exemplary embodiment of the present invention. FIG. 2 illustrates only a part of the mobile station for explanation of the first exemplary embodiment of the present invention.

As shown in FIG. 2, the mobile station according to the first exemplary embodiment of the present invention includes N mobile station antennas ($AM_0$, $AM_2$, ..., $AM_{N-1}$) 210, a downlink channel estimator 220, a beam vector generator 230, an uplink beamforming unit 240, and a radio frequency (RF) chain 250.

Figure 3:
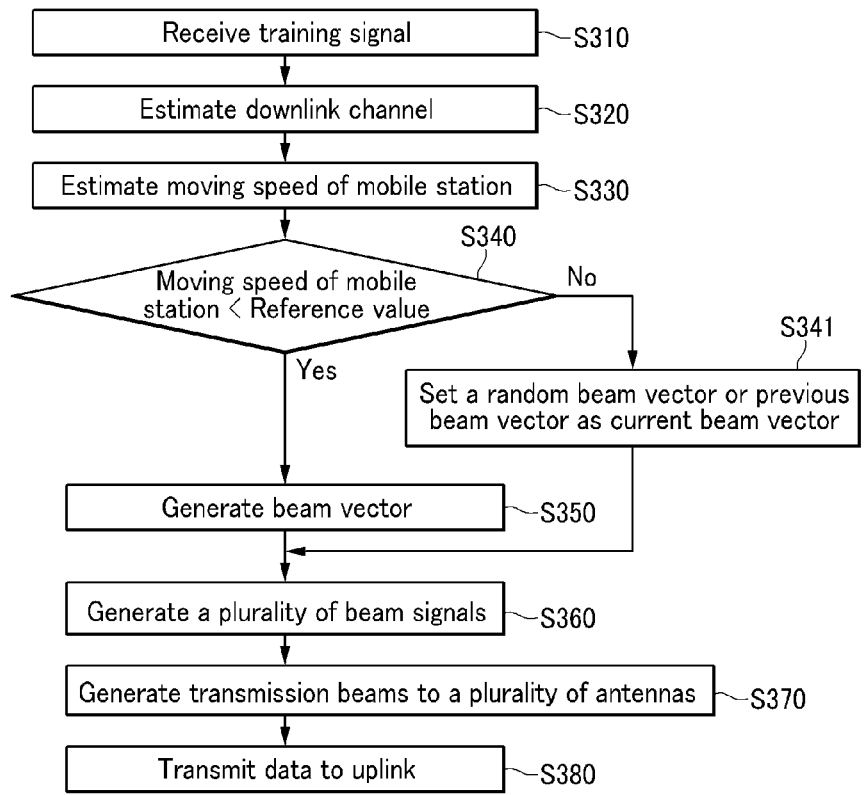
FIG. 3 is a flowchart of a beamforming process according to the first exemplary embodiment of the present invention.

FIG. 3 is a flowchart of a beamforming method according to the first exemplary embodiment of the present invention.

As shown in FIG. 3, the N mobile station antennas 210 receive at least one independent training signal from at least one of the plurality of base station antennas through a downlink channel (S310). In this case, the training signal is one of a preamble signal, a pilot signal, and/or a midamble signal.

The downlink channel estimator 220 estimates a downlink channel condition by using at least one training signal received by the respective N mobile station antennas 210 (S320). Herein, the downlink channel condition includes downlink channel values such as the gain and phase of the downlink channel. The downlink channel estimator 220 estimates the downlink channel condition y using a minimum mean-square error estimation (MMSE) algorithm. A method for estimating a downlink channel condition is well known to a person of ordinary skill in the art, and therefore no further description will be provided.

According to the first exemplary embodiment of the present invention, the downlink channel estimator 220 uses different methods for estimating a downlink channel in the following two cases that can be identified by a different number of independent training signals.

In the first case, the BS transmits one training signal to the mobile station by using one base station antenna among the M base station antennas, and the MB use only the one training signal transmitted from the one base station antenna for downlink channel estimation. In this case, the downlink channel estimator 220 generates N downlink channel values by estimating downlink channels for the one base station antenna and each of the N mobile station antennas.

In the second case, the BS transmits a plurality of independent training signals, each of which corresponds to one of the M base station antennas, to the mobile station by using each of the M base station antennas. In this case, the downlink channel estimator 220 estimates an N×M downlink MIMO channel matrix condition (where M is the number of base station antennas and N is the number of mobile station antennas). The downlink channel estimator 220 searches for one base station antenna that corresponds to a downlink channel in the best condition among the M base station antennas. Here, a downlink channel having the maximum gain may have the best channel condition.

Therefore, the downlink channel estimator 220 calculates a downlink channel gain of each of the M base station antennas, and searches for a downlink channel with respect to one base station antenna having the maximum gain. Math Figure 2 is used for calculating N downlink channel gains corresponding to a random base station antenna $AB_i$.

$$gain_i = \sum_{j=0}^{N-1} h_{i,j} h^*_{i,j},$$

$$0 \leq i \leq M-1$$

[Math Figure 2]

In Math Figure 2, $gain_i$ denotes a gain of a downlink channel corresponding to the base station antenna $AB_i$. In addition, $h_{i,j}$ denotes a downlink channel condition with respect to the base station antenna ABi and a mobile station antenna AMj, and $h^*_{i,j}$ denotes a conjugate complex number of the downlink channel condition with respect to the base station antenna ABi and the mobile station antenna AMj.

The downlink channel estimator 220 calculates a gain of a downlink channel with respect to each of the M base station antennas by using Math Figure 2, and searches for the maximum gain. In addition, the downlink channel estimator 220 selects a downlink channel of one base station antenna, which has the maximum gain, and generates N downlink channels that correspond to downlink channels formed by one base station antenna having the maximum gain and the plurality of mobile station antennas.

As described, the downlink channel estimator 200 generates the N downlink channels corresponding to a downlink channel that correspond to one base station antenna that transmits a training signal or one base station antenna that forms a channel with the maximum gain. In this instance, the N downlink channels are used for estimating an uplink channel that corresponds to a vector channel formed by one of M base station antennas.

When the mobile station moves at a high speed, a different between a downlink channel at a current time slot and an uplink channel at a subsequent time slot is significantly increased. Accordingly, the downlink channel estimator 220 measures the moving speed of the mobile station in order to reflect the moving speed of the mobile station to uplink channel estimation (S330).

Then, the beam vector generator 230 receives N downlink channel values that correspond to downlink channels between one base station antenna and the N mobile station antennas and moving speed of the mobile station from the downlink channel estimator 220, and compares the received moving speed with a reference value (S340). Here, the reference value implies moving speed that cannot guarantee similarity between an uplink channel and a downlink channel, and a detailed description of the reference value will be omitted since it is well known to a person of ordinary skill in the art.

When the moving speed of the mobile station is greater than the reference value, the beam vector generator 230 generates a beam vector (hereinafter referred to as a "current beam vector") that corresponds to an uplink channel of the current time slot without regarding the N downlink channel values. In other words, the beam vector generator 230 selects one of a random-generated beam vector and a previous beam vector as a current beam vector (S341). Here, the previous beam vector implies a beam vector applied to the N mobile station antennas 210 for forming a transmission beam that corresponds to an uplink channel of a previous time slot.

When the moving speed of the mobile station is lower than the reference value, the beam vector generator 230 generates beam vectors by using the N downlink channel values (S350). In this instance, the beam vector generator 230 generates the beam vector at every time point ay which the downlink channel estimator 220 estimates a downlink channel. In this way, an uplink channel condition can be estimated by using reversibility between the uplink channel and the downlink channel.

The beam vector is given by the following Math Figure 3.

$$c=[a_0 e^{j\theta_0}, a_1 e^{j\theta_2}, \ldots, a_{N-1} e^{j\theta_{N-1}}]$$

[Math Figure 3]

In Math Figure 3, c denotes a beam vector, and the beam vector c includes N beam coefficients that respectively correspond to the N mobile station antennas 210.

According to the first exemplary embodiment, gains $a_0$ to $a_{N-1}$ of the N beam coefficients are equally set to 1. In addition, phases $\theta_0$ to $\theta_{N-1}$ of the N beam coefficients can be respectively given by Math Figure 4.

$$\theta_n = -(\phi_n - \phi_0),$$

$$0 \leq n \leq N-1,$$

Figure 4:
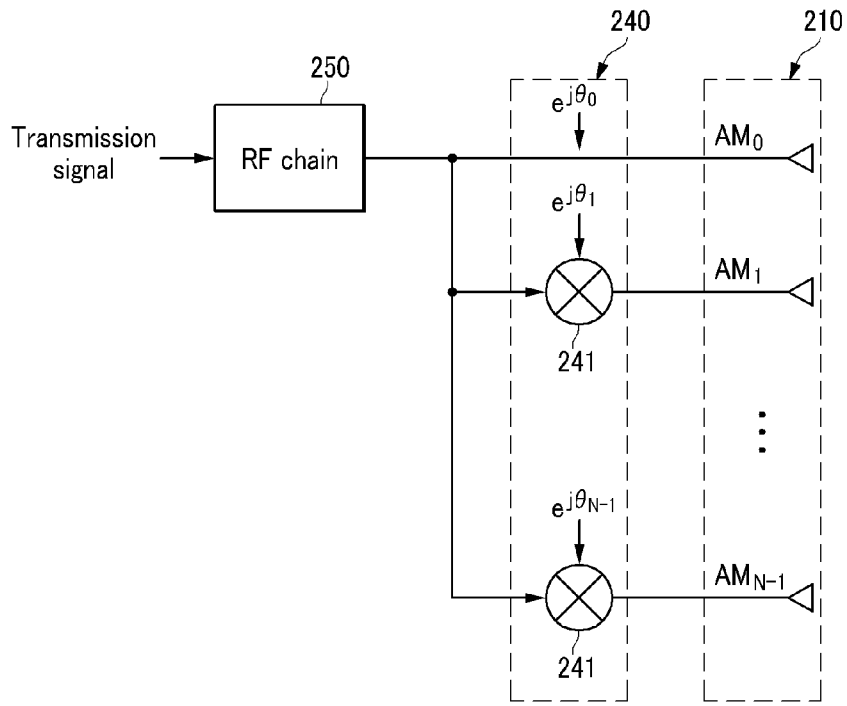
FIG. 4 is a configuration diagram of an uplink beamforming unit, a radio frequency (RF) chain unit, and a plurality of mobile station antennas according to the first exemplary embodiment of the present invention.

[Math Figure 4]

In Math Figure 4, $\theta_n$ denotes the phase of the n-th beam coefficient that corresponds to the n-th mobile station antenna. In addition, $\phi_n$ denotes the phase of a downlink channel between one base station antenna and the n-th mobile station antenna among the N downlink channels, and $\phi_0$ denotes the phase of a downlink channel between one base station antenna and the $0^{th}$ mobile station antenna 210 among the N mobile station antennas. Here, the one base station antenna is a base station antenna that transmits a training signal or a base station antenna that forms a downlink channel having the maximum gain.

As given in Math Figure 4, the phase $\theta_n$ of the n-th beam coefficient that corresponds to the n-th mobile station antenna may correspond to a difference between the phase $\phi_0$ of the downlink channel between the one base station and the 0-th mobile station antenna and the phase $\theta_n$ of the downlink channel between the one base station and the n-th mobile station antenna. In addition, the phase $\theta_0$ of the 0-th beam coefficient that corresponds to the 0-th mobile station antenna becomes 0 by Math Figure 4.

The beam vector generator 230 generates the beam vector as described above, and transmits the beam vector to the uplink beamforming unit 240.

The uplink beamforming unit 240 generates N beam signals by using an output signal of the RF chain 250 and the beam vector (S360).

According to the first exemplary embodiment of the present invention, the RF chain 250 is commonly connected to the N mobile station antennas 210 through the uplink beamforming unit 240. That is, as shown in FIG. 2, the RF chain 250 arranged in front of the uplink beamforming unit 240 frequency-converts a signal (hereinafter referred to as a transmission signal) to be transmitted to the base station from a baseband to a RF band, and amplifies the transmission signal for transmission over an uplink channel. As described, the RF chain 250 frequency-converts the transmission signal to the RF band and amplifies the converted transmission signal with a predetermined gain, and outputs the amplified RF signal to the uplink beamforming unit 240.

The uplink beamforming unit 240 generates N beam signals by using the RF signal and the beam vector (S360).

FIG. 4 shows a configuration diagram of the RF chain, the uplink beamforming unit, and the plurality of mobile station antennas according to the first exemplary embodiment of the present invention.

As shown in FIG. 4, the uplink beamforming unit 240 includes a plurality of multipliers 241. According to the first exemplary embodiment, each of the plurality of multipliers 241 can be replaced with a phase shifter since the gain of each of the N beam coefficients is 1.

The plurality of multipliers 241 respectively correspond to (N−1) mobile station antennas, excluding the 0-th mobile station antenna. Here, a beam signal applied to the 0-th mobile station antenna $AM_0$ equals an RF division signal since the phase $\theta_0$ of the 0-the beam coefficient that corresponds to the 0-th mobile station antenna $AM_0$ is 0 and accordingly the 0-th beam coefficient is 1 as given in Math Figure 4, and therefore the uplink beamforming unit 240 does not include the 0-th mobile station antenna $AM_0$.

The RF signal input to the uplink beamforming unit 240 is divided by N and is equally applied to N branches that are respectively connected with the N mobile station antennas. The plurality of multipliers 241 respectively apply the beam coefficient to the signal divided by N from the RF signal (hereinafter referred to as an RF division signal) so as to generate a plurality of beam signals that respectively correspond to the N mobile station antennas. That is, the n-th multiplier 241 corresponding to the n-th mobile station antenna $AM_n$ phase-shifts the RF division signal by using the n-th beam coefficient that corresponds to the n-th mobile station antenna $AM_n$, and applies the phase-shifted RF division signal (hereinafter referred to as a beam signal) to the n-th mobile station antenna $AM_n$.

According to the first exemplary embodiment, the uplink beamforming unit 240 generates N beam signals by using the beam vector and the RF division signal, and outputs the N beam signals to the N mobile station antennas 210.

FIG. 3 is a flowchart of a beamforming process according to the first exemplary embodiment of the present invention.

The N mobile station antennas 210 form transmission beams by using the N beam signals transmitted from the uplink beamforming unit 240 (S370). The mobile station transmits data to the base station over the uplink channel by using the transmission beams formed by the plurality of mobile station antennas 210 (S380).

As described, the uplink beamforming unit 240 according to the first exemplary embodiment of the present invention receives the RF signal from one RF chain 250. In this way, the number of RF chains 250 that consume high power for amplification of the transmission signal with a predetermined gain can be minimized, and accordingly, a power consumption level of the mobile station that forms an uplink beam by using the N mobile station antennas can be reduced to a power consumption level of a mobile station that forms an uplink beam by using one mobile station antenna.

A second exemplary embodiment of the present invention will now be described.

Figure 5:
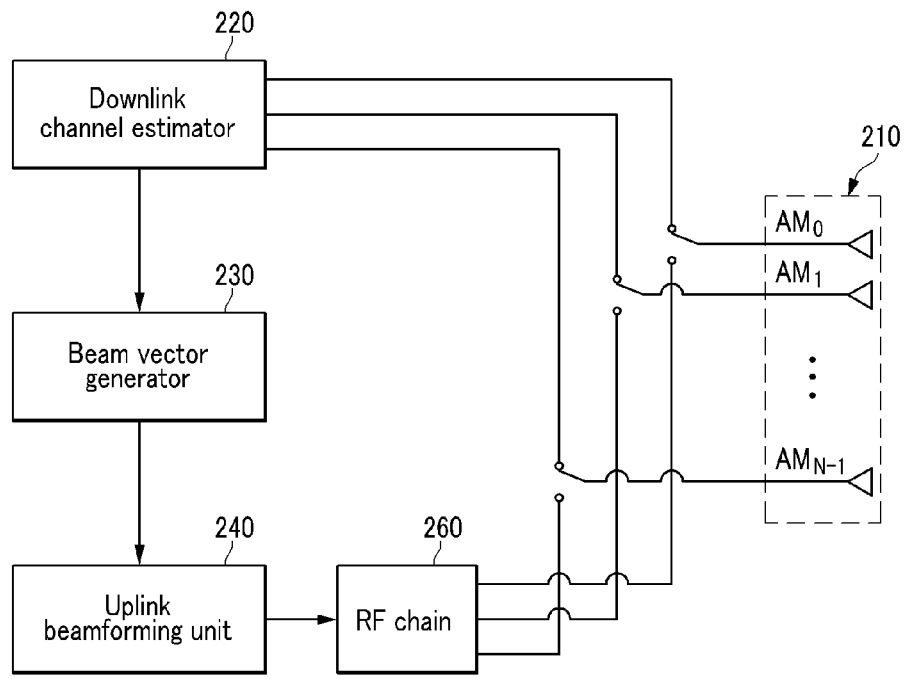
FIG. 5 is a block diagram of a mobile station according to a second exemplary embodiment of the present invention.

FIG. 5 shows a block diagram of a mobile station according to the second exemplary embodiment of the present invention.

As shown in FIG. 5, the mobile station according to the second exemplary embodiment includes N mobile station antennas 210 ($AM_0, AM_2, \ldots, AM_{N-1}$ in FIG. 5), a downlink channel estimator 220, a beam vector generator 230, an uplink beamforming unit 240, and an RF chain unit 260. Here, the RF chain unit 230 includes a plurality of RF chains.

The mobile station according to the second exemplary embodiment is similar to the mobile station of the first exemplary embodiment, and accordingly, descriptions of parts having been described will be briefly given or omitted.

Figure 6:
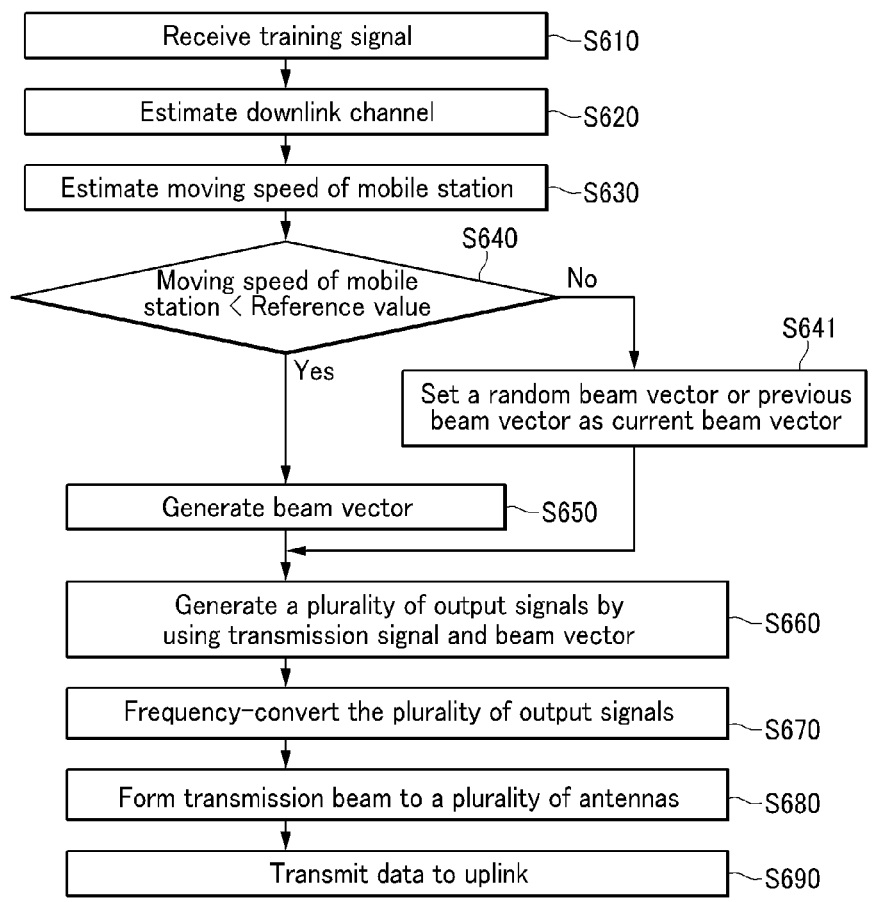
FIG. 6 is a flowchart of a beamforming process according to the second exemplary embodiment of the present invention.

FIG. 6 shows a flowchart of a beamforming method according to the second exemplary embodiment of the present invention.

As shown in FIG. 6, the N mobile station antennas 210 receive at least one independent training signal over a downlink channel from a plurality of base station antennas (S610). Here, the training signal may be one of a preamble signal, a pilot signal, or a midamble signal.

The downlink channel estimator 220 estimates a downlink channel condition by using the at least one training signal received by each of the N mobile station antennas 210 (S620).

According to the second exemplary embodiment, the downlink channel estimator 220 estimates a downlink channel by using different methods in the following three cases.

The first case is that the base station transmits a training signal to the mobile station by using one of M base station antennas and the base station uses only one training signal transmitted from one base station for downlink channel estimation. As in the first exemplary embodiment, the downlink channel estimator 220 estimates downlink channels between one base station and N mobile station antennas, and generates N downlink channels in the first case.

The second case is that the base station transmits M independent training signals that respectively correspond to the M base station antennas to M mobile stations by using the respective M base station antennas. As in the first exemplary embodiment, the downlink channel estimator 220 estimates an N×M downlink MIMO channel matrix condition (where M is the number of base station antennas and N is the number of mobile station antennas), and selects one base station antenna that forms a downlink channel in the best condition. Here, the downlink channel in the best condition may be a downlink channel having the maximum gain.

That is, like the first exemplary embodiment, the downlink channel estimator 220 calculates a downlink channel gain of each of the M base station antennas by using Math Figure 2, and searches for a downlink channel of one base station having the maximum gain. The downlink channel estimator 220 generates N downlink channels corresponding to the downlink channel of the one base station antenna having the maximum gain.

As described, according to the second exemplary embodiment, the downlink channel estimator 220 generates the N downlink channels corresponding to a downlink channel of a base station antenna that transmits a training signal or a downlink channel of a base station antenna that forms a channel with the maximum gain in the first and second cases. In this instance, the N downlink channels are used for estimating an uplink channel that corresponds to a vector channel formed by one of the M base station antennas.

In addition, as in the first exemplary embodiment, the downlink channel estimator 220 estimates moving speed of the mobile station (S630), and outputs the moving speed of the mobile station and the N downlink channels to the beam vector generator 230.

The beam vector generator 230 compares the received moving speed with a reference value (S640).

When the moving speed of the mobile station is greater than the reference value, the beam vector generator 230 generates a current beam vector without regarding the N downlink channels. In other words, the beam vector generator 230 selects one of a random-generated beam vector and a previous beam vector as the current beam vector (S641).

When the moving speed of the mobile station is less than the reference value, the beam vector generator 230 generates a beam vector as given in Math Figure 3 by using the N downlink channels (S650). As in the first exemplary embodiment, the beam vector generator 230 generates the beam vector at every time that the downlink channel estimator 220 estimates a downlink channel. In this way, an uplink channel condition can be estimated by using reversibility between an uplink channel and a downlink channel.

As given in Math Figure 3, the beam vector c according to the second exemplary embodiment includes N beam coefficients that respectively correspond to the N mobile station antennas 210. The beam coefficient according to the second exemplary embodiment can be obtained as given in Math Figure 5.

$$a_n e^{j\theta_n} = \frac{1}{\sqrt{N}} \times e^{-j\phi_n} \qquad \text{[Math Figure 5]}$$

In Math Figure 5, $e^{j\theta_n}$ denotes the n-th beam coefficient that corresponds to the n-th mobile station antenna, and $\phi_n$ denotes the phase of a downlink channel between one base station antenna and the n-th mobile station antenna among the N downlink channels. Here, the one base station antenna is a base station that transmits a training signal or a base station that forms a downlink channel having the maximum gain.

As given in Math Figure 5, according to the second exemplary embodiment, gains $a_0$ to $a_{N-1}$ of the N beam coefficients are equally set to $$\frac{1}{\sqrt{N}}$$

In addition, the phase $\theta_n$ of the n-th beam coefficient that corresponds to the n-th mobile station antenna can be expressed by an inverse number of the phase $\phi_n$ of a downlink channel between one base station antenna and the n-th mobile station antenna.

According to the second exemplary embodiment, a method for the downlink channel estimator 220 to estimate a downlink channel in the third case will be described.

Like the second case, the third case is that the base station transmits M independent training signals that respectively correspond to the M base station antennas to the mobile station by using the respective M base station antennas. In the third case, according to the second exemplary embodiment, the beam vector generator 230 generates a plurality of candidate beam vectors that respectively include a plurality of beam coefficients, each of which has the same gain, and generates a beam vector by selecting a candidate beam vector having the maximum gain when an uplink MIMO channel condition of a subsequent time slot is applied.

In other words, in the third case, the downlink channel estimator 220 estimates a condition of an N×M downlink MIMO channel matrix (where M is the number of base station antennas and N is the number of mobile station antennas). Then, the downlink channel estimator 220 outputs M×N downlink channels that correspond to the N×M downlink MIMO channel matrix to the beam vector generator 230.

The beam vector generator 230 generates N candidate beam vectors as given in Math Figure 6.

$$c_n = \frac{1}{\sqrt{N}} \begin{bmatrix} 1, e^{j\frac{2\pi n}{N}}, e^{j2\frac{2\pi n}{N}}, \\ e^{j3\frac{2\pi n}{N}}, \dots, e^{j(N-1)\frac{2\pi n}{N}} \end{bmatrix}, \qquad \text{[Math Figure 6]}$$

$$0 \leq n \leq N-1$$

In Math Figure 6, $c_n$ denotes the n-th candidate beam vector among the N candidate beam vectors. Each of the N candidate beam vectors includes N beam coefficients that respectively correspond to the N mobile station antennas $AM_0$ to $AM_{N-1}$.

As shown in Math Figure 6, gains of the N beam coefficients that are included in the n-th candidate beam vector $c_n$ are equally set to $$\frac{1}{\sqrt{N}}.$$

In addition, each phase of the N beam coefficients is proportional to an index of the corresponding candidate beam vector and an index of a mobile station antenna that corresponds to each of beam coefficients. That is, the x-th beam coefficient included in the n-th candidate beam vector corresponds to the x-th mobile station antenna $AM_x$ among the N mobile station antennas, and the phase of the x-th beam coefficient corresponds to an index n of the candidate beam vector and an index x (0≤x≤N−1) of the x-th mobile station antenna $AM_x$.

Figure 7:
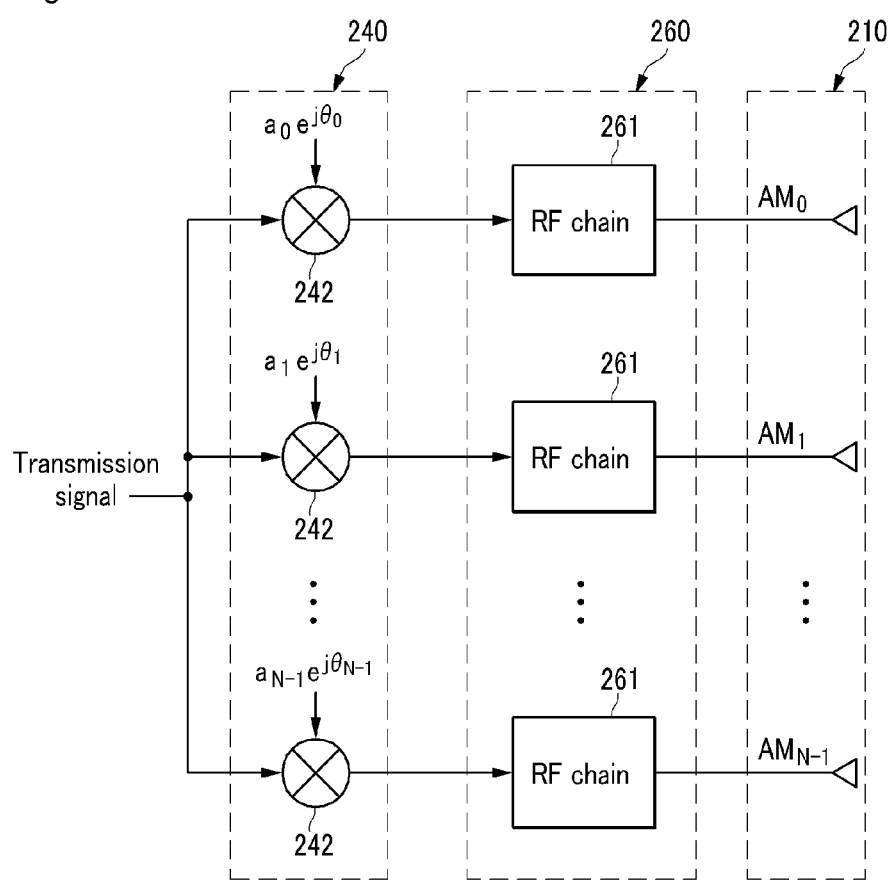
FIG. 7 is a configuration diagram of an uplink beamforming unit, a RF chain unit, and a plurality of mobile station antennas according to the second exemplary embodiment of the present invention.

The beam vector generator 230 calculates a gain of each of the N candidate beam vectors in the case of applying an M×N uplink MIMO channel matrix (where M is the number of base station antennas and N is the number of mobile station antennas) of a subsequent time slot by using Math Figure 7.

$$\text{gain}_n = \|Hc_n\|^2, \qquad \text{[Equation 7]}$$

$$0 \leq n \leq N-1$$

In Math Figure 7, H denotes an M×N uplink MIMO channel matrix formed by N mobile station antennas and M base station antennas. Here, an uplink channel of a subsequent time slot can be estimated to be the same as a downlink channel of the current time slot if moving speed of the mobile station is less than the reference value in the TDD system. Therefore, according to the second exemplary embodiment, the beam vector generator 230 calculates a gain of each of the N candidate beam vectors by applying N×M downlink channels received from the downlink channel estimator 220 to the M×N uplink MIMO channel matrix H.

In addition, the beam vector generator 230 selects a candidate beam vector having the maximum gain in the case of applying an uplink MIMO channel of a subsequent time slot from among the N candidate beam vectors as a current beam vector.

As described, according to the second exemplary embodiment, the beam vector generator 230 generates the beam vector and outputs the generated beam vector to the uplink beamforming unit 240 in each of the first to third cases.

The uplink beamforming unit 240 generates N output signals (hereinafter referred to as "preliminary beams") that respectively correspond to the N mobile station antennas by using a transmission signal and a beam vector (S660). The RF chain unit 260 frequency-converts the N output signals to the RF band and amplifies the frequency-converted signals with a predetermined gain so as to generate a plurality of beam signals (S670). Here, as a baseband signal, the transmission signal is a signal to be transmitted to the base station.

FIG. 7 is a configuration diagram of an uplink beamforming unit, an RF chain unit, and a plurality of mobile station antennas according to the second exemplary embodiment of the present invention.

As shown in FIG. 7, the uplink beamforming unit 240 according to the second exemplary embodiment includes a plurality of multipliers 242 that respectively correspond to the N mobile station antennas.

According to the second exemplary embodiment, the N multipliers 242 generate N output signals that respectively correspond to the N mobile station antennas by applying each of the beam coefficients to the transmission signal. That is, the n-th multiplier 242 generates the n-th output signal that corresponds to the n-th mobile station antenna $AM_n$ by multiplying the n-th beam coefficient $e^{j\Theta_n}$ that corresponds to the n-th mobile station antenna $AM_n$ and the transmission signal. Here, the N output signals correspond to baseband signals.

The RF chain unit 260 includes a plurality of RF chains 261 that respectively correspond to the N mobile station antennas.

The N RF chains 261 are respectively connected between the N multipliers 242 and the N mobile station antennas. That is, the n-th RF chain 261 that corresponds to the n-th mobile station antenna is connected between the n-th multiplier 242 that corresponds to the n-th mobile station antenna and the n-th mobile station antenna.

According to the second exemplary embodiment, the N RF chains 261 frequency-convert the plurality of output signals to an RF band and amplify the frequency-converted signals for transmission over an uplink, and then apply the amplified signals to the respective N mobile station antennas. That is, the n-th RF chain 261 that corresponds to the n-th mobile station antenna frequency-converts the n-th output signal to the RF band and amplifies the frequency-converted signal with a predetermined gain, and then applies the amplified signal to the n-th mobile station antenna.

As described, according to the second exemplary embodiment, the uplink beamforming unit 240 generates the N output signals by using the beam vectors and the transmission signals. In addition, the RF chain unit 260 applies the N output signals to the respective N mobile station antennas after performing frequency-conversion and amplification on the N output signals.

FIG. 6 is a flowchart of a beamforming process according to the second exemplary embodiment of the present invention.

The N mobile station antennas 210 form transmission beams by using the N signals received from the RF chain unit 260 (S680). In addition, the mobile station transmits data to the base station over an uplink channel by using the transmission beams formed by the plurality of mobile station antennas 210 (S690).

As described, according to the second exemplary embodiment of the present invention, the mobile station includes N RF chains that respectively correspond to the N mobile station antenna, and equally sets gains of the N beam coefficients that respectively correspond to the N mobile station antennas to $\frac{1}{\sqrt{N}}$.

In this way, the respective N RF chains consume the same amount of power for amplifying the N output signals, and therefore, a power consumption level of a mobile station that uses N mobile station antennas does not greatly increase compared to a power consumption level of a mobile station that uses a single antenna.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A beamforming method of a mobile station, the beamforming method comprising:

receiving, by the mobile station, at least one training signal from a plurality of base station antennas by using a plurality of mobile station antennas;

measuring, by the mobile station, a moving speed of the mobile station;

estimating, by the mobile station, downlink channels formed by the plurality of base station antennas and the plurality of mobile station antennas by using the at least one training signal;

estimating, by the mobile station, uplink channels by using the downlink channels and a predetermined constant, when the moving speed of the mobile station is lower than a reference value;

generating, by the mobile station, a beam vector corresponding to a current time slot using the estimated uplink channels when the moving speed of the mobile station is lower than the reference value;

generating a beam vector that has been applied to the plurality of the mobile station antennas for previous beamforming as the beam vector corresponding to the current time slot, when the moving speed of the mobile station is greater than the reference speed; and beamforming, by the mobile station, by applying the beam vector corresponding to the current time slot generated according to the moving speed of the mobile station to the plurality of mobile station antennas to transmit a signal through the uplink channels.

2. The beamforming method of claim 1, wherein the generating of the beam vector corresponding to the current time slot using the estimated uplink channels comprises:

selecting one base station antenna that forms a downlink channel with the maximum gain from among the plurality of base station antennas; and generating the beam vectors by using a plurality of phases that respectively correspond to downlink channels formed by the one base station and the plurality of mobile station antennas.

3. The beamforming method of claim 2, wherein the beam vector has a plurality of beam coefficients that respectively correspond to the plurality of mobile station antennas, and each of the plurality of beam coefficients has the same gain.

4. The beamforming method of claim 3, wherein each phase of the plurality of beam coefficients corresponds to an inverse number of each of the plurality of phases.

5. The beamforming method of claim 4, wherein the beamforming comprises:
generating a plurality of beam signals by respectively applying the plurality of beam coefficients to a baseband signal;
generating a plurality of beam signals in a wireless band by frequency-converting the plurality of beam signals into wireless band signals; and
beamforming by respectively applying the beam signals in the wireless band to the plurality of mobile station antennas.

6. The beamforming method of claim 3, wherein the phases of the plurality of beam coefficients respectively correspond to a difference between the phase of a downlink channel formed by one of the plurality of mobile station antennas and the one base station antenna and each of the plurality of phases.

7. The beamforming method of claim 6, wherein the beamforming comprises:
generating a plurality of beam signals in a wireless band by respectively applying the plurality of beam coefficients to the wireless band signals; and
beamforming by respectively applying the plurality of beam signals to the respective mobile station antennas.

8. The beamforming method of claim 1, wherein the generating of the beam vector comprises:
generating a plurality of candidate beam vectors that respectively include a plurality of beam coefficients that respectively correspond to the plurality of mobile station antennas;
calculating a plurality of gains that respectively correspond to the plurality of candidate beam vectors by using the plurality of candidate beam vectors and downlink channels formed by the respective base station antennas and the respective mobile station antennas;
detecting a gain having the maximum gain from among the plurality of gains; and
generating the beam vector by selecting one beam vector that corresponds to the maximum gain from among the plurality of candidate beam vectors,
wherein the number of the plurality of candidate beam vectors corresponds to the number of the plurality of mobile station antennas.

9. The beamforming method of claim 8, wherein the phase of each of the plurality of beam coefficients is proportional to an index of each candidate beam vector and an index of a mobile station that corresponds to the beam coefficient, and
a gain of each of the plurality of beam coefficients corresponds to an inverse number of a square root of the number of the plurality of mobile station antennas.

10. A beamforming method of a mobile station, the beamforming method comprising:
receiving, by the mobile station, a training signal from one base station by using a plurality of mobile station antennas;
measuring, by the mobile station, a moving speed of the mobile station;
estimating, by the mobile station, downlink channels formed by the one base station antenna and the plurality of mobile station antennas by using the training signal;
estimating, by the mobile station, uplink channels by using the downlink channels and a predetermined constant, when the moving speed of the mobile station is lower than a reference value;
generating, by the mobile station, a beam vector corresponding to a current time slot using the estimated uplink channels when the moving speed of the mobile station is lower than a reference value;
generating a beam vector that has been applied to the plurality of the mobile station antennas for previous beamforming as the beam vector corresponding to the current time slot, when the moving speed of the mobile station is greater than the reference value; and
beamforming, by the mobile station, by applying the beam vector corresponding to the current time slot generated according to the moving speed of the mobile station to the plurality of mobile station antennas to transmit a signal through the uplink channels.

11. The beamforming method of claim 10, wherein the generating of the beam vector corresponding to the current time slot using the estimated uplink channels comprises:
generating the beam vector by using a plurality of phases that respectively correspond to the downlink channels,
wherein the beam vector includes a plurality of beam coefficients that respectively correspond to the respective mobile station antennas, and
the plurality of beam coefficients respectively have the same gain.

12. The beamforming method of claim 11, wherein the phase of each of the plurality of beam coefficients corresponds to an inverse number of each of the plurality of phases.

13. The beamforming method of claim 12, wherein the beamforming comprises:
generating a plurality of beam signals by respectively applying the plurality of beam coefficients to a baseband signal;
generating a plurality of beam signals in a wireless band by frequency-converting the plurality of beam signals to wireless band signals; and
beamforming by respectively applying the plurality of beam signals in the wireless band to the plurality of mobile station antennas.

14. The beamforming method of claim 11, wherein each phase of the plurality of beam coefficients corresponds to a difference between the phase of a downlink channel formed by one of the plurality of mobile station antennas and the one base station antenna and each of the plurality of phases.

15. The beamforming method of claim 14, wherein the beamforming comprises:
generating a plurality of beam signals by respectively applying the plurality of beam coefficients to a wireless band signal; and
beamforming by respectively applying the plurality of beam signals to the respective mobile station antennas.

16. A mobile station comprising:
a plurality of antennas configured to receive a training signal from a base station;
a downlink channel estimator configured to measure a moving speed of the mobile station, estimate downlink channels formed by the base station and the plurality of antennas using the training signal, and estimate uplink channel by using the downlink channels and a predetermined constant, when the moving speed of the mobile station is lower than a reference value;

a beam vector generator configured to generate a beam vector corresponding to a current time slot using the estimated uplink channels when the moving speed of the mobile station is lower than the reference value, and to generate a beam vector that has been applied to the plurality of the mobile station antennas for previous beamforming as the beam vector corresponding to the current time slot when the moving speed of the mobile station is greater than the reference value; and an uplink beamforming unit configured to beamform by applying the beam vector corresponding to the current time slot generated according to the moving speed of the mobile station to the plurality of mobile station antennas to transmit a signal through the uplink channels.

17. The mobile station of claim 16, wherein the beam vector generator generates the beam vector corresponding to the current time slot by using a plurality of phases that respectively correspond to the downlink channels when the moving speed of the mobile station is lower than a reference value; wherein the beam vector includes a plurality of beam coefficients that respectively correspond to the respective mobile station antennas, and the plurality of beam coefficients respectively have the same gain.

18. The mobile station of claim 16, wherein the uplink beamforming unit is configured to:

generate a plurality of beam signals by respectively applying the plurality of beam coefficients to a baseband signal;

generate a plurality of beam signals in a wireless band by frequency-converting the plurality of beam signals to wireless band signals; and beamform by respectively applying the plurality of beam signals in the wireless band to the plurality of mobile station antennas.

\* \* \* \* \*